United States Patent [19]
Mieda et al.

[11] Patent Number: 5,962,126
[45] Date of Patent: Oct. 5, 1999

[54] METHOD AND APPARATUS FOR REPRODUCING DATA FROM A MAGNETO-OPTICAL RECORDING MEDIUM HAVING A READOUT LAYER, TRANSFER LAYER AND RECORDING LAYER

[75] Inventors: Michinobu Mieda, Shiki-gun; Hiroyuki Katayama; Akira Takahashi, both of Nara; Kenji Ohta, Kitakatsuragi-gun, all of Japan

[73] Assignee: Sharp Kabushiki Kaisha, Osaka, Japan

[21] Appl. No.: 08/975,517

[22] Filed: Nov. 20, 1997

Related U.S. Application Data

[60] Continuation of application No. 08/546,567, Oct. 20, 1995, abandoned, which is a division of application No. 08/179,577, Jan. 10, 1994, abandoned.

[30] Foreign Application Priority Data

Jan. 29, 1993 [JP] Japan .................................. 5-14168

[51] Int. Cl.$^6$ ........................................................ G11B 5/66
[52] U.S. Cl. .................................. 428/332; 428/694 ML; 428/694 SC; 428/694 MT; 428/694 RE; 428/694 NF; 428/694 MM; 428/694 EC; 428/900; 428/332; 369/13; 369/283; 369/284; 369/286
[58] Field of Search ...................... 428/694 ML, 694 SC, 428/694 MT, 694 RE, 694 NF, 694 MM, 694 EC, 336, 332, 900; 369/13, 283, 284, 286

[56] References Cited

FOREIGN PATENT DOCUMENTS

| 0498461 | 8/1992 | European Pat. Off. . |
| 0509836 | 10/1992 | European Pat. Off. . |
| 0523944 | 1/1993 | European Pat. Off. . |
| 0498461 | 8/1996 | European Pat. Off. . |
| 03093056 | 4/1991 | Japan . |

OTHER PUBLICATIONS

"Super Resolution in Magneto–Optical Disks" (M. Kaneko et al., Magazine of Japan Applied Magnetic Society, vol. 15, No. 5, 1991, pp. 838–844).

"Read Out Mechanism of Magnetically Induced Super Resolution" (M. Ohto et al., Proceedings of Magneto–Optical Recording International Symposium '91, J. Magn. Soc. pn., vol. 15, Supplement No. S1 (1991), pp. 319–322).

Primary Examiner—Leszek Kiliman
Attorney, Agent, or Firm—David G. Conlin; William J. Daley, Jr.

[57] ABSTRACT

The invention features an apparatus and method for reproducing recorded bits from a magneto-optical recording medium. The medium includes a base, a readout layer formed on the base, a transfer layer formed on the readout layer and a recording layer formed on the transfer layer. The readout and recording layers each exhibit perpendicular magnetization in a temperature range between room temperature and, respectively, the readout layer's Curie temperature and the recording layer's Curie temperature. The transfer layer is predominant in-plane magnetization at room temperature and an in-plane to perpendicular magnetization transition occurs at a temperature above room temperature. Also, the recording layer Curie temperature is lower than the Curie temperature of the transfer layer. The reproducing method includes the steps of projecting a light beam, applying a subsidiary magnetic field and reproducing information based on reflected light from the readout layer while applying the subsidiary magnetic field. The light beam is projected onto the readout layer from the side of the base so the in-plane to perpendicular magnetization transition occurs in a portion of the transfer layer, the portion corresponding to a central portion of the light beam spot. The intensity of the subsidiary magnetic field is higher than the coercive force of the readout layer and less than the exchange coupling force exerted from the recording-layer and the transfer layer to the readout layer.

25 Claims, 5 Drawing Sheets

METHOD AND APPARATUS FOR REPRODUCING DATA FROM A MAGNETO-OPTICAL RECORDING MEDIUM HAVING A READOUT LAYER, TRANSFER LAYER AND RECORDING LAYER

This is a continuation of application Ser. No. 08/546,567, filed Oct. 20, 1995, which is a divisional of application Ser. No. 08/179,577, filed Jan. 10, 1994, now abandoned.

FIELD OF THE INVENTION

The present invention relates to a magneto-optical recording medium such as a magneto-optical disk, a magneto-optical tape, a magneto-optical card, etc., designed for a magneto-optical recording device and also relates to a method for reproducing from the magneto-optical recording medium.

BACKGROUND OF THE INVENTION

Research and development on magneto-optical disks have been intensified as being rewritable optical disks, and some of the magneto-optical disks have been already practically used as external memories designed for computers.

In the magneto-optical disk, a magnetic thin film with perpendicular magnetization is used as a recording medium, and light is used in recording and reproducing. Thus, compared with a floppy disk or a hard disk including a magnetic thin film with in-plane magnetization, the magneto-optical disk has a larger storage capacity.

Recently, a still larger storage capacity is demanded, and in order to meet the demand, not only for the hard disks but also for the magneto-optical disks, earnest research has been made in pursuit of still higher recording density.

For the magneto-optical disk, the recording density is determined by the size of a spot of a recording-use or reproduction-use light beam formed on the disk. Further, the size of a recording bit to be reproduced is determined by a light beam diameter.

In the case of a normal optical recording, since a light beam is converged to a diffraction limit by a converging lens, the light intensity distribution shows a Gaussian distribution, and thus the temperature distribution on the magneto-optical disk is like a Gaussian distribution. Thus, an area having a temperature rise above a predetermined temperature has a smaller diameter than the light beam diameter. Here, if only the area having the temperature rise can be made subjected to reproduction, the recording density can be significantly improved.

Here, a method for reproducing a recording bit recorded at high density in which the above restriction can be avoided has been proposed (see, for example, Journal by the Japan Applied Magnetic Society, page 838, Vol. 15, No. 5, 1991).

Figure 11:
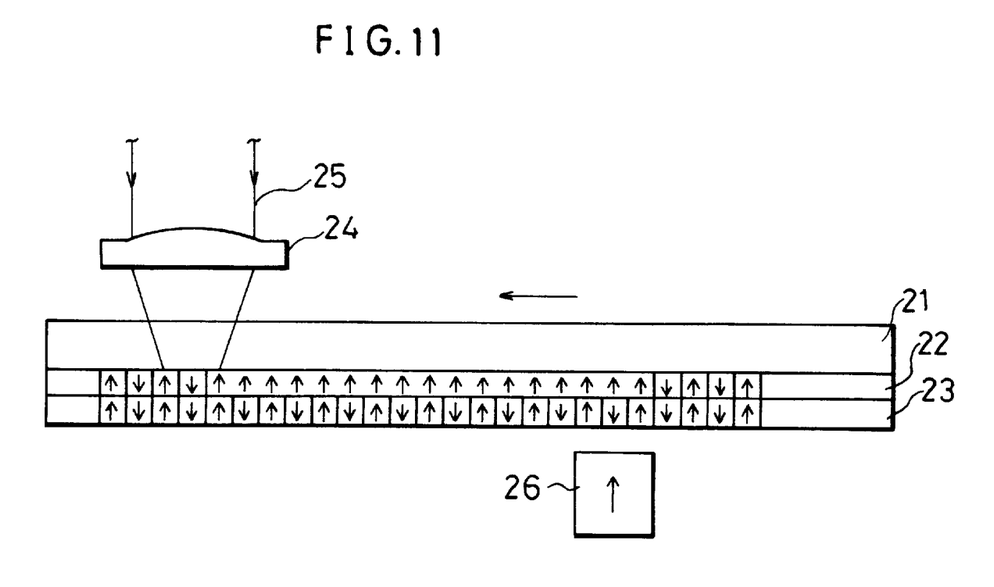
FIG. 11 which shows a conventional example is an explanatory view of recording and reproducing operations on and from a magneto-optical disk.

As shown in FIG. 11, a magneto-optical disk which is composed of a substrate 21 whereon a readout layer 22 and a recording layer 23 are formed may be used in the above method. The recording layer 23 has large coercive force at room temperature. On the other hand, the readout layer 22 has small coercive force at room temperature. As the temperature of an area subjected to reproduction in the readout layer 22 is raised, the magnetization in the area is arranged in the magnetization direction in the recoding layer 23 by being affected by the recording layer 23. Namely, by the exchange coupling force exerted between the readout layer 22 and the recording layer 23, the magnetization direction in the recording layer 23 is copied to the readout layer 22.

In the above arrangement, a recording operation is carried out by the general magneto-optical recording method. In reproducing the recording bit, first, the readout layer 22 is initialized. Namely, in order to arrange the magnetization direction in the readout layer 22 in a predetermined direction (upward in FIG. 11), subsidiary magnetic field is applied from a subsidiary magnetic field generation device 26. Next, a reproduction-use light beam 25 is converged on the readout layer 22 by the objective lens 24 so as to raise the temperature at the portion, and as a result, the information in the form of a magnetization direction recorded on the recording layer 23 is copied to the readout layer 22. In the above method, only the area having a temperature rise above a predetermined temperature which is located around the center of a spot of the reproduction-use light beam 25 can be made subjected to reproduction, thereby enabling a reproduction of a smaller recording bit compared with the case where the conventional reproducing method is used.

However, in the above arrangement, prior to the reproducing operation, subsidiary magnetic field must be applied from the subsidiary magnetic field generation device 26. Moreover, in reproducing, the information in the form of a magnetization direction copied from the recording layer 23 to the readout layer 22 remains even after the temperature of the previously reproduced portion drops. Therefore, when the spot of the reproduction-use light beam 25 is shifted so as to reproduce the next recording bit, the previously reproduced recording bit (the bit just copied) still remains within the spot of the reproduction-use light beam 25. Since this will be the cause of generating noise in reproducing, the above method presents the problem in that an improvement in the recording density is restrained.

SUMMARY OF THE INVENTION

The present invention features a reproducing apparatus for reproducing data recorded onto a magneto-optical recording medium and a method for reproducing recorded information from the magneto-optical recording medium. Also featured is a magneto-optical recording medium which permits a reproduction of a recording bit recorded at high density and a desirable signal quality.

The magneto-optical recording medium of the present invention includes a base; a readout layer formed on the base, which has perpendicular magnetization in a temperature range between room temperature and Curie temperature; a transfer layer formed on the readout layer, which is predominant in in-plane magnetization at room temperature, and in which a transition occurs from in-plane magnetization to perpendicular magnetization at a predetermined temperature above room temperature; a recording layer formed on the transfer layer, which has perpendicular magnetization in a temperature range between room temperature and curie temperature and wherein the recording layer has a Curie temperature lower than the Curie temperature of the transfer layer.

The reproducing apparatus for reproducing data recorded onto a magneto-optical recording medium, as described above, includes a magnetic field generation device to generate a subsidiary magnetic field and a light projection means for projecting a reproducing light beam through first the base and then onto the readout layer. The subsidiary magnetic field interacts only with the readout layer. Also, the intensity of the subsidiary magnetic field being generated is higher than the coercive force of the readout layer and less than the exchange coupling force exerted from the recording layer and the transfer layer to said readout layer.

The reproducing method of the instant invention for reproducing a recorded bit from the magneto-optical recording medium of the instant invention includes the steps of projecting a light beam, applying a subsidiary magnetic field and reproducing information from the medium based on a reflected light from the readout layer while applying the subsidiary magnetic field.

The step of projecting the light beam includes projecting the light beam onto the readout layer from the side of the medium's base so a transition from in-plane magnetization to perpendicular magnetization occurs in a portion of the transfer layer. This portion of the transfer layer corresponds to a central portion of the beam spot of the light beam, that is the portion of the beam spot being in the highest temperature range.

The subsidiary field being applied has an intensity that is higher than the coercive force of the readout layer. The intensity also is less than the exchange coupling force exerted from the recording layer and the transfer layer to the readout layer.

In the above arrangement, in reproducing, when a light beam is projected onto the magneto-optical recording medium, the temperature distribution in the irradiated area is like a Gaussian distribution. Thus, the temperature of the area located around the center of the spot of the light beam, which has a shorter diameter than the spot of the light beam, is heated to a higher temperature than the peripheral portion.

As the temperature of the area in the transfer layer is raised above a predetermined temperature, a transition occurs in the area from in-plane magnetization to perpendicular magnetization. As a result, by the exchange coupling force exerted between adjacent layers among the readout layer, the transfer layer and the recording layer, the magnetization direction in the readout layer is arranged in the magnetization direction in the recording layer. Then, the information recorded on the recording layer is copied to the readout layer through the transfer layer. The information copied to the readout layer can be reproduced based on a reflected light from the readout layer, thereby permitting a reproduction of a recording bit with a size smaller than the Light spot formed on the readout layer.

When a spot of the light beam is shifted so as to reproduce the next recording bit, the temperature of the previously reproduced portion drops, and thus a transition occurs in the portion from perpendicular magnetization to in-plane magnetization. Accordingly, the exchange coupling force is no longer exerted between adjacent two layers among the readout layer, the transfer layer and the recording layer in the portion having a temperature drop. Thus, the information in the form of a magnetization direction recorded on the recording layer is masked by the in-plane magnetization in the transfer layer. This means that the bit just copied no longer exists in the light spot formed on the readout layer. Thus, noise can be reduced and an improvement in the signal quality can be achieved.

In order to achieve the above object, the reproducing method of the present invention from a magneto-optical recording medium which is composed of a base; a readout layer formed on the base, which has perpendicular magnetization in a temperature range between room temperature and Curie temperature; a transfer layer formed on the readout layer, which is predominant in in-plane magnetization at room temperature, and in which a transition occurs from in-plane magnetization to perpendicular magnetization at a predetermined temperature above room temperature; and a recording layer which has perpendicular magnetization in a temperature range between room temperature and Curie temperature is characterized by comprising the steps of:

projecting a light beam onto the readout layer from the side of the base so that a transition occurs in the transfer layer from in-plane magnetization to perpendicular magnetization; and reproducing information based on a light reflected from the readout layer while subsidiary magnetic field having a higher intensity than that of the coercive force of the readout layer is being applied.

In the above arrangement, information is reproduced from the above magneto-optical recording medium based on the reflected light from the readout layer while subsidiary magnetic field having a higher intensity than the coercive force of the readout layer is being applied. Thus, in reproducing, in addition to the above effect, in the area where the exchange coupling force is not exerted between adjacent two layers among the readout layer, the transfer layer and the recording layer, the magnetization direction in the readout layer is arranged in the magnetization direction in the subsidiary magnetic field. As a result, interference by signals from the adjoining bits hardly occurs, thereby achieving an improvement in the signal quality.

For a fuller understanding of the nature and advantages of the invention, reference should be made to the ensuing detailed description taken in conjunction with the accompanying drawings.

BRIEF DESCRIPTION OF THE DRAWINGS

FIG. 1 through FIG. 10 show one embodiment of the present invention.

DESCRIPTION OF THE EMBODIMENTS

The following description will discuss one embodiment of the present invention in reference to FIG. 1 through FIG. 10.

Figure 1:
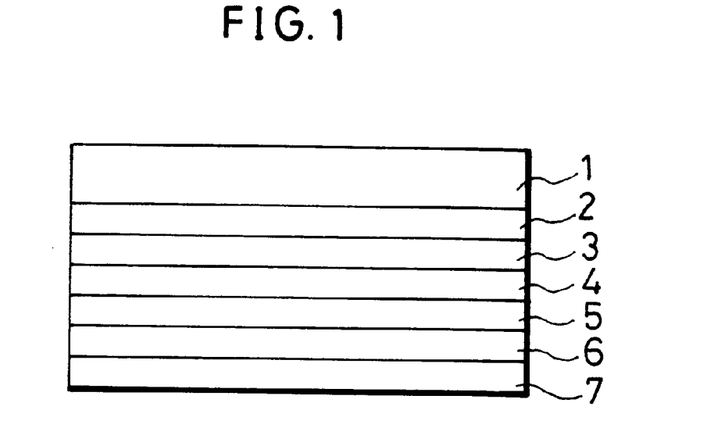
FIG. 1 is a cross-sectional view which shows a schematic configuration of a magneto-optical disk in accordance with the present invention.

As shown in FIG. 1, a magneto-optical disk (magneto-optical recording medium) of the present embodiment is composed of a substrate 1 (base) whereon a transparent dielectric film 2, a readout layer 3, a transfer layer 4, a recording layer 5, a protective film 6 and an overcoat film 7 are laminated in this order.

For the readout layer 3, a material which has perpendicular magnetization in a temperature range between room temperature and Curie temperature is used. The coercive force at room temperature is preferably in a range of 10–50 kA/m. Furthermore, since the polar Kerr rotation angle can be made greater by setting the Curie temperature higher, the Curie temperature is preferably in a range of 200–300° C.

For the transfer layer 4, a material which is predominant in in-plane magnetization at room temperature, and in which a transition occurs from in-plane magnetization to perpendicular magnetization at a. predetermined temperature above room temperature is used.

For the recording layer 5, a material which has perpendicular magnetization in a temperature range between room temperature and Curie temperature is used. Here, Curie temperature is not limited as long as it is within a temperature range suitable for recording, i.e., within a range of 150–250° C.

Figure 2:
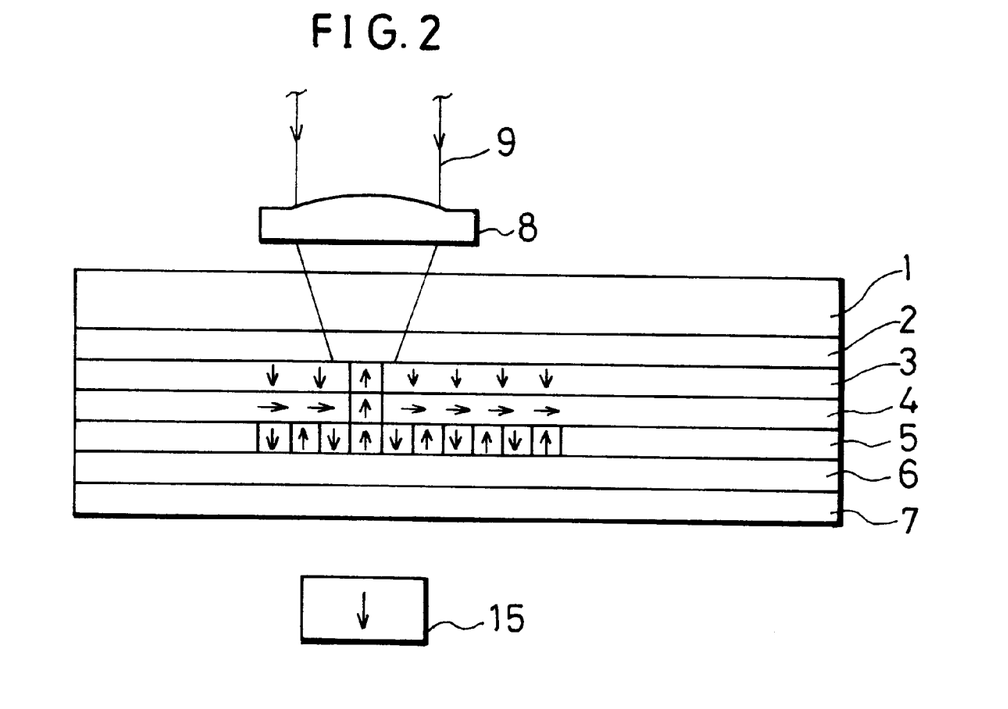
FIG. 2 is an explanatory view which shows recording and reproducing operations on and from the magneto-optical disk of FIG. 1.

Recording and reproducing processes in the above arrangement will be explained below in reference to FIG. 2.

In recording, a light beam 9 is converged onto the readout layer 3 by an objective lens 8. Since the temperature distribution of the irradiated portion shows Gaussian distribution, only the temperature of the area having a diameter smaller than the light spot diameter is raised.

In the temperature rising process, a transition occurs from in-plane magnetization to perpendicular magnetization in the area having a temperature rise of the transfer layer 4. Here, if the recording magnetic field is applied, the magnetization direction in the irradiated portion is arranged in the magnetization direction in the recording magnetic field. In the cooling off process, the magnetization direction in the transfer layer 4 is copied to the recording layer 5, thereby recording information on a predetermined portion of the recording layer 5 as desired.

In reproducing, a light beam 9 having an intensity set lower than that used in recording is projected onto a predetermined portion of the readout layer 3 as desired so as to raise the temperature of the portion. As the temperature of the portion is raised, a transition occurs from in-plane magnetization to perpendicular magnetization in the portion having a temperature rise of the transfer layer 4. As a result, by the exchange coupling force exerted between adjacent layers among the readout layer 3, the transfer layer 4 and the recording layer 5, the magnetization direction in the readout layer 3 is arranged in the magnetization direction in the recording layer 5. Namely, with the effect from the recording layer 5, the magnetization direction in the transfer layer 4 is arranged in the magnetization direction in the recording layer 5. Furthermore, with the effect from the transfer layer 4, the magnetization direction in the readout layer 3 is arranged in the magnetization direction in the transfer layer 4.

As described, the information recorded on the recording layer 5 is copied to the readout layer 3 through the transfer layer 4. The information copied to the readout layer 3 is reproduced based on a reflected light from the readout layer 3.

When a spot of the light beam 9 is shifted so as to reproduce the next recording bit, the temperature of the previously reproduced portion drops, and thus a transition occurs in the transfer layer 4 from perpendicular magnetization to in-plane magnetization. Accordingly, in the portion having a temperature drop, the exchange coupling force is no longer exerted between adjacent two layers among the readout layer 3, the transfer layer 4 and the recording layer 5, and the information in the form of a magnetization direction recorded on the recording layer 5 is not reproduced by being masked by the in-plane magnetization in the transfer layer 4.

Here, if the subsidiary magnetic field which has a higher intensity than the coercive force of the readout layer 3 is applied from a magnetic field generation device 15, the magnetization direction in the readout layer 3 is arranged in the magnetization direction in the subsidiary magnetic field. Thus, interference by signals from adjoining bits, which causes a noise, is eliminated.

As described, since only the area having a temperature rise above a predetermined temperature is subjected to reproduction, a recording bit with a diameter smaller than that of the spot of the light beam 9 can be reproduced, thereby achieving a significant improvement in the recording density. Moreover, since the perpendicular magnetization is arranged in one direction in other areas than the area subjected to reproduction, noise can be reduced, thereby ensuring a desirable signal quality.

An example of the magneto-optical disk of the present embodiment is shown below.

The substrate 1 is made of a disk-shaped glass with a diameter of 86 mm, an inner diameter of 15 mm and a thickness of 1.2 mm. Although it is not shown, a guide track for guiding a light beam is formed with a pitch of 1.6 μm, a groove width of 0.8 μm and a land width of 0.8 μm.

On the surface of the substrate 1 whereon the guide track is formed, AlN with a thickness of 80 nm is formed as the transparent dielectric film 2.

For the readout layer 3, a rare-earth transition metal alloy thin film made of DyFeCo with a thickness of 20 nm is formed on the transparent dielectric film 2. The composition of DyFeCo is $Dy_{0.14}(Fe_{0.8}Co_{0.2})_{0.86}$, and the Curie temperature thereof is around 250° C. The coercive force of the readout layer 3 at room temperature is small and it is set in a range of 10–50 kA/m.

For the transfer layer 4, a rare-earth transition metal alloy thin film made of GdFeCo with a thickness of 50 nm is formed on the readout layer 3. The composition of GdFeCo is $Gd_{0.26}(Fe_{0.82}Co_{0.18})_{0.74}$, and Curie temperature thereof is around 300° C.

For the recording layer 5, a rare-earth transition metal alloy thin film made of DyFeCo with a thickness of 50 nm is formed on the transfer layer 4. The composition of DyFeCo is $Dy_{0.23}(Fe_{0.78}Co_{0.22})_{0.77}$, and Curie temperature thereof is around 200° C.

For the protective film 6, AlN with a thickness of 20 nm is formed on the recording layer 5.

For the overcoat film 7, ultraviolet hardening resin from polyurethane acrylate series with a thickness of 5 μm is formed on the protective film 6.

Figure 3:
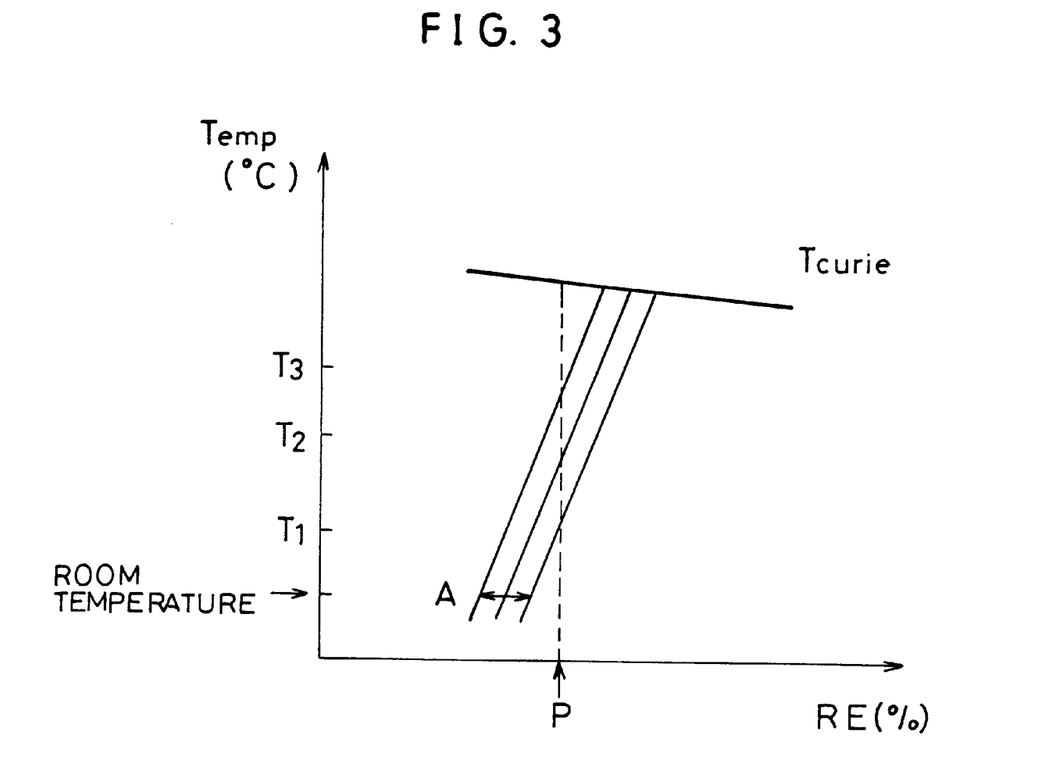
FIG. 3 is a magnetic phase diagram which shows the magnetic property of the transfer layer in the magneto-optical disk of FIG. 1.

As shown in the magnetic phase diagram of FIG. 3, a composition range where the rare-earth transition metal alloy used in the transfer layer 4 has perpendicular magnetization (shown by A in the figure) is extremely narrow. This is because the perpendicular magnetization appears only in the vicinity of a compensating composition (shown by P in the figure) where the magnetic moment of the rare-earth metal and the magnetic moment of the transition metal balance with one another.

The respective magnetic moments of the rear-earth metal and the transition metal have mutually different temperature dependencies. Specifically, the magnetic moment of the transition metal is greater than that of the rare-earth metal at high temperature. Thus, the composition of alloy is set such that the content of the rare-earth metal is greater than that in the compensating composition at room temperature so that the alloy does not have perpendicular magnetization at room temperature but has in-plane magnetization. When a light beam is projected, as the temperature of the portion irradiated with the light beam is raised, the magnetic moment of the transition metal becomes relatively greater until it balances with that of the rare-earth metal, thereby having perpendicular magnetization.

FIG. 4 through FIG. 7 show one example of the hysteresis characteristics of the transfer layer 4. In the figures, x-axis indicates an external magnetic field (Hex) to be applied perpendicularly onto the surface of the transfer layer 4, and y-axis indicates polar Kerr rotation angle (θk) when a light beam is incident perpendicularly on the surface of the transfer layer 4.

Figure 4:
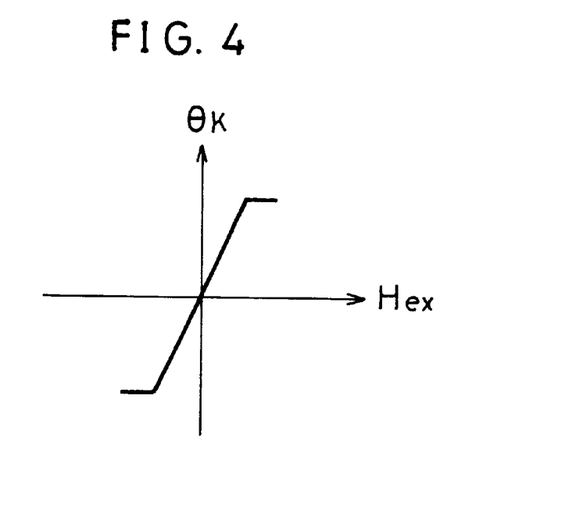
FIG. 4 is an explanatory view showing a relationship between an external magnetic field to be applied onto the transfer layer and a polar Kerr rotation angle in a range of room temperature–$T_1$ of FIG. 3.
Figure 5:
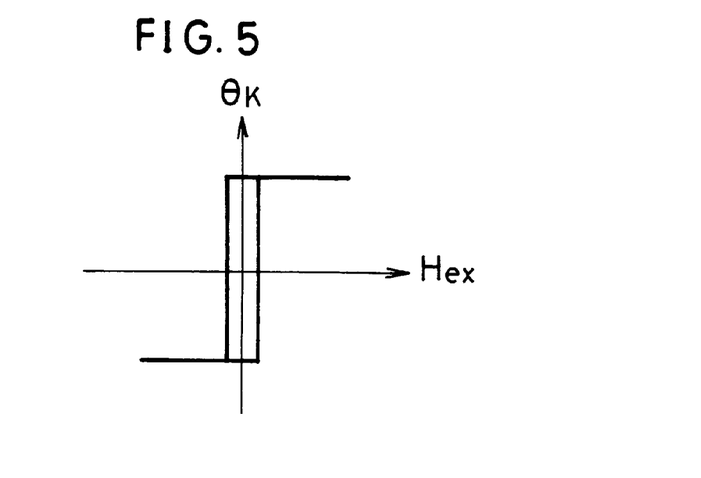
FIG. 5 is an explanatory view showing a relationship between an external magnetic field to be applied onto the transfer layer and a polar Kerr rotation angle in a range of $T_1$–$T_2$ of FIG. 3.
Figure 6:
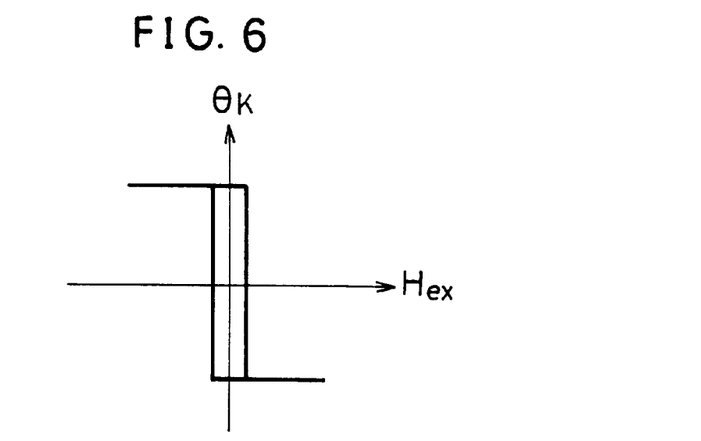
FIG. 6 is an explanatory view showing a relationship between an external magnetic field to be applied onto the transfer layer and a polar Kerr rotation angle in a range of $T_2$–$T_3$ of FIG. 3.
Figure 7:
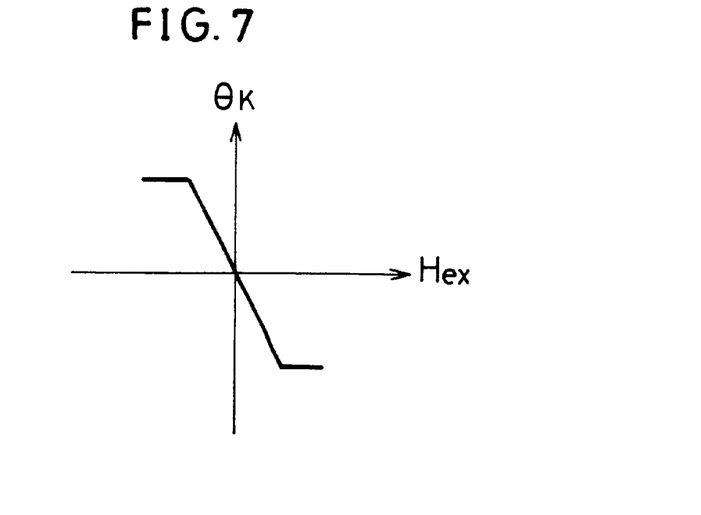
FIG. 7 is an explanatory view showing a relationship between an external magnetic field to be applied onto the transfer layer and a polar Kerr rotation angle in a range of $T_3$–Curie temperature $T_C$ of FIG. 3.

FIG. 4 shows hysteresis characteristic of the transfer layer 4 in a temperature range of room temperature–$T_1$, the transfer layer 4 having the composition shown by P in the magnetic phase diagram of FIG. 3. FIG. 5 through FIG. 7 respectively show hysteresis characteristics in temperature ranges of $T_1$–$T_2$; $T_2$–$T_3$; and $T_3$–Curie temperature $T_C$.

In the temperature range of $T_1$–$T_3$, the transfer layer 4 shows such a hysteresis characteristic that an abruptly rising of Kerr rotation angle appears with respect to the external magnetic field. In other temperature ranges, however, the polar Kerr rotation angle when no external magnetic field is applied is substantially zero.

With the combination of the readout layer 3, the transfer layer 4 and the recording layer 5, the transfer layer 4 is predominant in in-plane magnetization at room temperature (i.e., in a direction parallel to the transfer layer 4), and a transition occurs in the transfer layer 4 from in-plane magnetization to perpendicular magnetization in a temperature range of 100–125° C.

The magneto-optical disk was manufactured in the following manner.

The guide track was directly formed on the surface of the glass substrate 1 by a reactive ion etching method.

The transparent dielectric film 2, the readout layer 3, the transfer layer 4, the recording layer 5 and the protective film 6 were successively formed by the sputtering method under vacuum in a common sputtering device. AlN for use in both the transparent dielectric film 2 and the protective film 6 was formed by the reactive sputtering method in which the sputtering of an Al target was carried out in $N_2$ gas atmosphere. The readout layer 3, the transfer layer 4 and the recording layer 5 were formed by sputtering a composite target whereon Gd tip or Dy tip was arranged on a FeCo alloy target, or by sputtering a ternary alloy target of GdFeCo and DyFeCo using Ar gas.

The overcoat film 7 was formed by applying an ultraviolet hardening resin from polyurethane acrylate series by a spin coating machine, and thereafter, by applying ultraviolet ray from an ultraviolet ray projection device so as to harden it.

In the present embodiment, DyFeCo is used as a material for the readout layer 3. However, for example, TbFeCo, GdTbFe, NdDyFeCo, GdDyFeCo or GdTbFeCo may be used as well.

Additionally, by slightly adding at least one element selected from the group consisting of Nd, Pt, Pr and Pd to the above materials, the greater Kerr rotation angle can be achieved with a short wavelength almost without losing the properties required for the readout layer 3. As a result, the magneto-optical disk, which ensures a high quality reproducing signal even when the semiconductor laser with a short wavelength is used, can be achieved.

Although a suitable film thickness of the readout layer 3 differs depending on the material, the composition thereof and the film thickness of the transfer layer 4, it is preferably set in a range of 20–50 nm.

The composition of GdFeCo used in the transfer layer 4 is not limited to $Gd_{0.26}(Fe_{0.82}Co_{0.18})_{0.74}$ as long as the transfer layer 4 is predominant in in-plane magnetization at room temperature and a transition occurs therein from in-plane magnetization to perpendicular magnetization at a predetermined temperature above room temperature. As to the rare-earth transition metal alloy, by varying the ratio of the rare-earth to the transition metal, the compensation temperature at which the magnetic moment of the rare-earth and the magnetic moment of the transition metal balance with one another can be adjusted. Since GdFeCo is from a material series which has perpendicular magnetization in the vicinity of its compensation temperature, temperature at which a transition occurs from in-plane magnetization to perpendicular magnetization can be adjusted by changing the compensation temperature by adjusting the ratio of Gd to FeCo.

Figure 8:
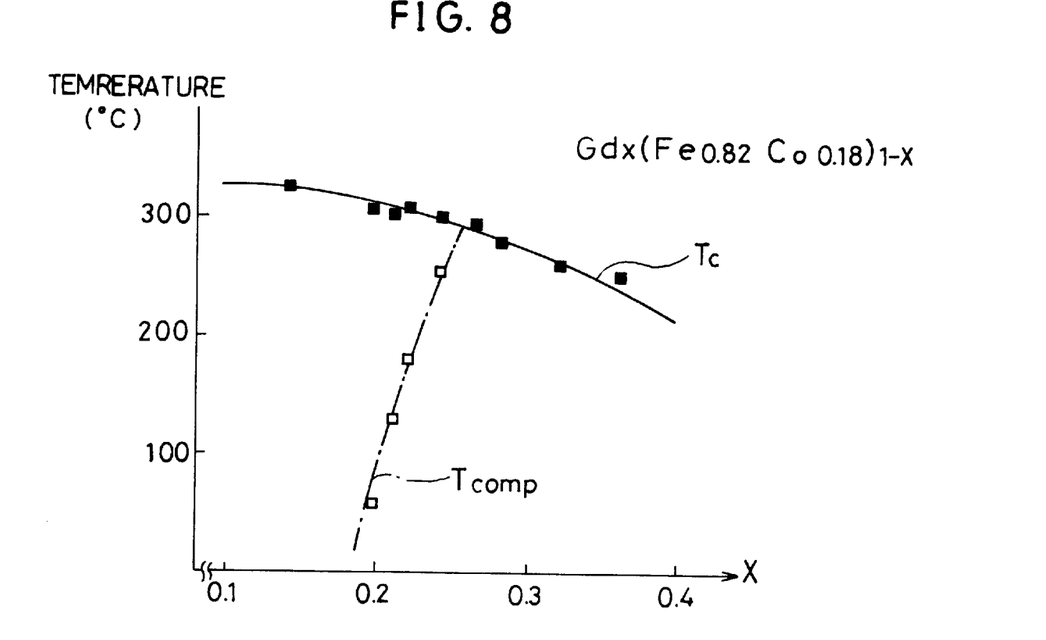
FIG. 8 is a graph which shows composition dependencies of Curie temperature ($T_C$) and compensation temperature ($T_{comp}$) of $Gd_X(Fe_{0.82}Co_{0.18})_{1-X}$.

FIG. 8 shows experimental results of compensation temperature and Curie temperature with a composition rate X in $Gd_X(Fe_{0.82}Co_{0.18})_{1-X}$, i.e., when the composition of Gd is varied.

As is clear from FIG. 8, in the compensating composition range where the compensation temperature is a predetermined temperature above room temperature (25° C.), the composition rate X is set equal to or above 0.18, and it is preferably set so as to satisfy the inequality: $0.19<X<0.29$. This is because when the composition rate X is set within the above range, in the configuration where the readout layer 3, the transfer layer 4 and the recording layer 5 are laminated, temperature at which a transition occurs from in-plane magnetization to perpendicular magnetization falls within a desirable range between room temperature and around 200° C. If the above temperature becomes too high, there arises the possibility that the reproduction-use laser power becomes as high as the recording-use laser power, and thus the information recorded on the recording layer 5 may be disturbed.

The following will explain a change in the properties (compensation temperature and Curie temperature) in the case where the ratio of Fe to Co is varied in the GdFeCo series, i.e., the composition rate Y is varied in $Gd_X(Fe_{1-Y}Co_Y)_{1-X}$.

Figure 9:
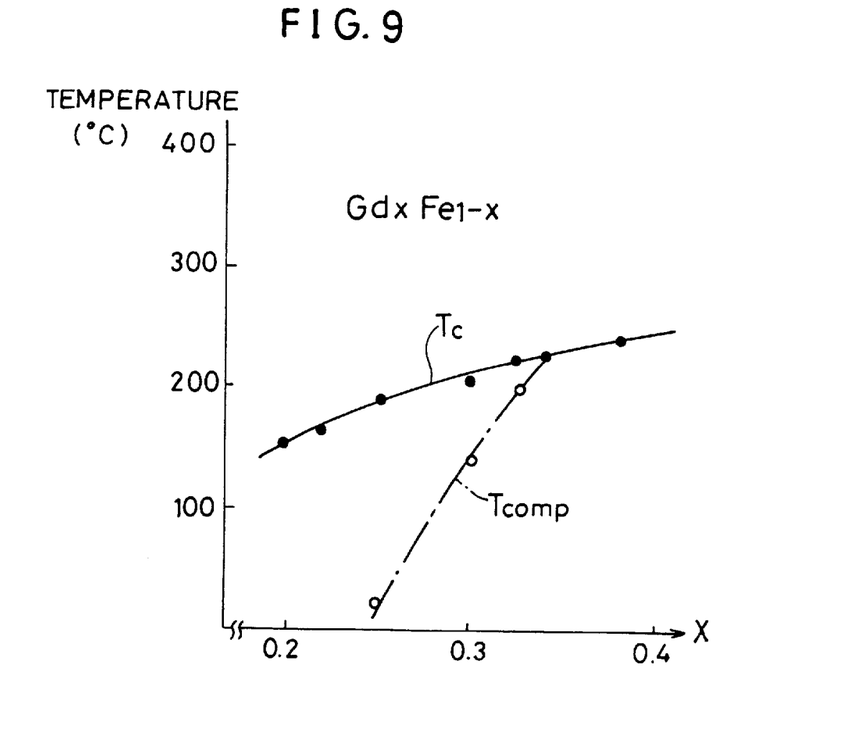
FIG. 9 is a graph which shows composition dependencies of Curie temperature ($T_C$) and compensation temperature ($T_{comp}$) of $Gd_XFe_{1-X}$.

FIG. 9 shows the property of $Gd_X(Fe_{1-Y}Co_Y)_{1-X}$ when Y=0, i.e., the property of $Gd_XFe_{1-X}$. For example, when X=0.3 in the composition of Gd, the compensation temperature is around 120° C. and the Curie temperature is around 200° C.

Figure 10:
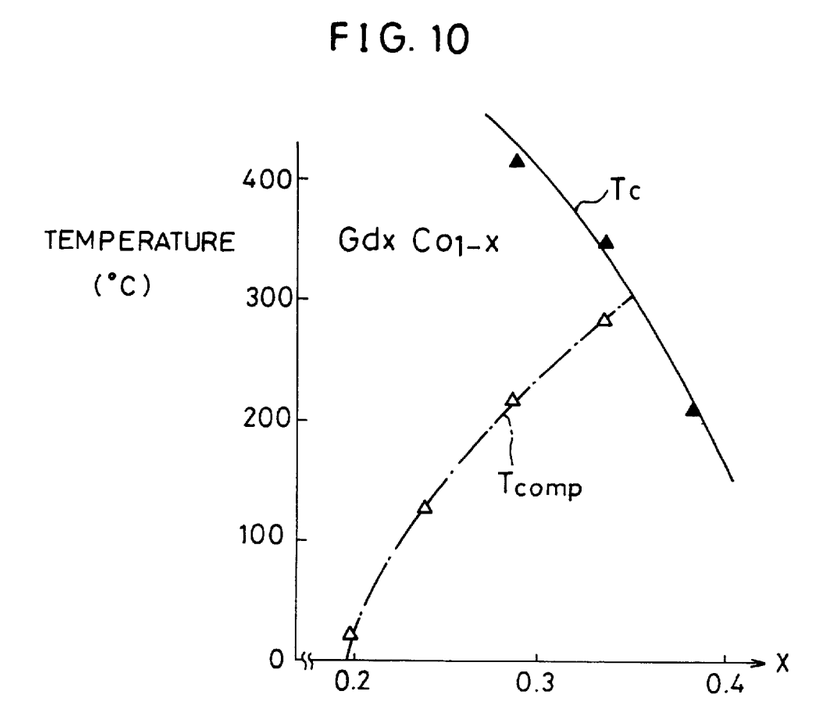
FIG. 10 is a graph which shows composition dependencies of Curie temperature ($T_C$) and compensation temperature ($T_{comp}$) of $Gd_XCo_{1-X}$.

FIG. 10 shows the property of $Gd_X(Fe_{1-Y}Co_Y)_{1-X}$ when Y=1, i.e., the property of $Gd_XCo_{1-X}$. For example, when X=0.3 in the composition of Gd, the compensation temperature is around 220° C. and the Curie temperature is around 400° C.

As can be seen, with the same composition of Gd, as the content of Co increases, the compensation temperature and Curie temperature go up.

From FIG. 9 and FIG. 10, the composition rate Y in $Gd_X(Fe_{1-Y}Co_Y)_{1-X}$ is preferably set so as to satisfy the following inequality:

$$0.1<Y<0.5.$$

Needless to say, the properties of the transfer layer 4, such as temperature at which a transition occurs from in-plane magnetization to perpendicular magnetization are affected by the materials, the compositions thereof and the film thicknesses of readout layer 3 and the recording layer 5. This is because exchange coupling force is exerted magnetically between the readout layer 3 and the recording layer 5. Therefore, an appropriate composition of the material used in the transfer layer 4 and the film thickness of the transfer layer 4 differ depending on the materials, the compositions thereof and the film thicknesses of the readout layer 3 and the recording layer 5.

As an optimum material for the transfer layer 4 in the magneto-optical disk of the present embodiment, GdFeCo wherein an abrupt transition occurs from in-plane magnetization to perpendicular magnetization is used. However, even when other rare-earth transition metal alloys (to be described later) are used, the same effect can be obtained.

The $Gd_XFe_{1-X}$ has properties shown in FIG. 9, and when the composition rate x satisfies the inequality: $0.24<X<0.35$, it has a compensation temperature at a predetermined temperature above room temperature.

The $Gd_XCo_{1-X}$ has properties shown in FIG. 10, and when the composition rate X satisfies the inequality: $0.20<X<0.35$, it has a compensation temperature at a predetermined temperature above room temperature.

When the FeCo alloy is used as a transition metal, $Tb_X(Fe_YCo_{1-Y})_{1-X}$ has its compensation temperature at a predetermined temperature above room temperature when the composition rate X satisfies the inequality: $0.20<X<0.30$ (Y is selected at random). $Dy_X(Fe_YCo_{1-Y})_{1-X}$ has its compensation temperature at predetermined temperature above room temperature when the composition rate X satisfies the inequality: $0.24<X<0.33$ (Y is selected at random). $Ho_X(Fe_YCo_{1-Y})_{1-X}$ has its compensation temperature at a predetermined temperature above room temperature when the composition rate X satisfies $0.25<X<0.45$ (Y is selected at random).

In the embodiment, the film thickness of the transfer layer 4 is set 50 nm. However, it is not limited to the above thickness. As explained earlier, the magnetic properties of the transfer layer 4 are affected by the readout layer 3 and the recording layer 5, and thus an appropriate thickness for the transfer layer 4 differs depending on the material, the composition thereof and the film thickness of each layer. However, the film thickness of at least 20 nm is required for the transfer layer 4, and more preferably, it is set above 50 nm. On the other hand, if the transfer layer 4 is too thick, the information recorded on the recording layer 5 may not be copied to the transfer layer 4. Thus, it is preferably set below 100 nm.

As to the material for the recording layer 5, a material which has perpendicular magnetization in a temperature range between room temperature and Curie temperature and which has a Curie temperature suitable for recording (i.e., around a range of 150–250° C.) may be used. In the present embodiment, DyFeCo is used as a material for the recording layer 5. Since DyFeCo is a material having a small perpendicular magnetic anisotoropy, with the use of DyFeCo, a desirable recording operation can be carried out even with the external magnetic field of low intensity.

Other suitable materials for the recording layer 5 are TbFeCo, GdTbFe, NdDyFeCo, GdDyFeCo and GdTbFeCo. Additionally, by adding at least one element selected from the group consisting of Cr, V, Nb, Mn, Be and Ni to the above materials, a reliable performance of the recording layer 5 can be ensured for a longer period of time. The suitable thickness of the recording layer 5 is determined by the material, the composition thereof and the film thickness of the transfer layer 4, and it is preferably set in a range of 20–100 nm.

The thickness of AlN (transparent dielectric film 2) is not limited to 80 nm.

The thickness of the transparent dielectric film 2 is determined in considering a so-called Kerr effect enhancement which increases a polar Kerr rotation angle of the readout layer 3 by utilizing the interference effect of light in reproducing from the magneto-optical disk. In order to make the signal quality (C/N) in reproducing as high as possible, the Kerr rotation angle is set as large as possible. Thus, the film thickness of the transparent dielectric film 2 is set so that the polar Kerr rotation angle is maximized.

The film thickness changes depending on the wavelength of the reproducing light and the refractive index of the transparent dielectric film 2. In the present embodiment, AlN is used as a material for the transparent dielectric film 2, which has the refractive index of 2.0 with respective to the reproducing light with a wavelength of 780 nm. Thus, by setting the film thickness of AlN (the transparent dielectric film 2) within a range of 30–120 nm, a large Kerr effect enhancement can be achieved. More preferably, the film thickness of AlN is set within a range of 70–100 nm because the polar Kerr rotation angle is almost maximized.

The above explanation has been given through the case of the reproducing light with a wavelength of 780 nm. However, the wavelength of the reproducing light is not limited to this. For example, when a reproducing light with a wavelength of 400 nm which is substantially ½ of the above wavelength of 780 nm, the thickness of the transparent dielectric film 2 is preferably set ½ of the film thickness when the reproducing light with the wavelength of 780 nm is used.

Additionally, the refractive index of the transparent dielectric film 2 may be changed depending on a material used in the transparent dielectric film 2 or the manufacturing method of the transparent dielectric film 2. In such a case, the thickness of the transparent dielectric film 2 is adjusted so as to set the refractive index×the film thickness (=optical path length) constant.

As can be seen from the above explanation, by making the refractive index of the transparent dielectric film 2 greater, the film thickness of the transparent dielectric film 2 can be made thinner, and the greater enhance effect of the polar Kerr rotation angle can be achieved.

The refractive index of AlN is changed by changing the ratio of Ar to $N_2$ (sputtering gas used in sputtering), the gas pressure, etc. In general, AlN has relatively large refractive index of around the range of 1.8–2.1, and thus it is a suitable material for the transparent dielectric film 2.

Not only for the enhancement of the Kerr effect, the transparent dielectric film 2 also prevents the oxidization of the readout layer 3, the transfer layer 4 and the recording layer 5 which are magnetic layers made of rare-earth transition metal alloy as the protective film 6 does.

The magnetic layer made of rare-earth transition metal is likely to be oxidized, and especially, rare-earth metal is very likely to be oxidized. Therefore, entering of oxygen and moisture from outside must be prevented in order to prevent the deterioration of the properties of the layers.

Therefore, in the present embodiment, the readout layer 3, the transfer layer 4 and the recording layer 5 are sandwiched by the AlN films. Since the AlN film is a nitride film which does not include oxygen, its moisture resistance is high.

Furthermore, AlN which has a large refractive index (in the vicinity of 2) is transparent, and it does not include oxygen. Thus, with the use of AlN, a stability of the magneto-optical disk can be ensured for a long period of time. Additionally, using the Al target, a reactive DC (direct current) sputtering may be carried out by introducing $N_2$ gas or mixed gas of Ar and $N_2$. In this sputtering method, a faster film forming speed can be achieved compared with the RF (rapid frequency) sputtering method.

Other than AlN, the following materials which have large refractive index are suitable for the transparent dielectric film 2: SiN, AlSiN, AlTaN, SiAlON, TiN, TiON, BN, ZnS, $TiO_2$, $BaTiO_3$, $SrTiO_3$, etc.

In the present embodiment, the film thickness of the AlN used in the protective film 6 is set to 20 nm. However, the film thickness of the protective film 6 is not limited to this, and it is preferably set in a range of 1–200 nm.

In the present embodiment, the magnetic layer composed of the film thickness of the readout layer 3, the transfer layer 4 and the recording layer 5 being laminated is set at 120 nm thick. With this thickness, a light which is incident thereon from the optical pickup is hardly transmitted through the magnetic layer. Therefore, the film thickness of the protective film 6 is not specified as long as the oxidization of the film can be prevented for a long period of time. Specifically, when the material which has low oxidization resistance is used, the film thickness should be made thick; on the other hand, when the material which has high oxidization resistance is used, the film thickness should be made thin.

The thermal conductivity of the protective film 6 affects the recording sensitivity of the magneto-optical disk as well as the thermal conductivity of the transparent dielectric film 2. Specifically, the recording sensitivity represents the laser power required, for recording or erasing. The light incident on the magneto-optical disk is mainly transmitted through the transparent dielectric film 2. Then, it is absorbed by the readout layer 3, the transfer layer 4 and the recording layer 5 which serve as absorbing films, and changes into heat. Here, heat generated from the readout layer 3, the transfer layer 4 and the recording layer 5 moves onto the transparent dielectric film 2 and the protective film 6 by the thermal conduction. Therefore, the respective thermal conductivities and the thermal capacities (specific heat) of the transparent dielectric film 2 and the protective film 6 affect the recording sensitivity.

This means that the recording sensitivity of the magneto-optical disk can be controlled to some extent by adjusting the film thickness of the protective film 6. For example, by making the film thickness of the protective film 6 thinner, the recording sensitivity can be increased (a recording or erasing operation can be carried out using a lower laser power). Normally, in order to extend the life of the laser, it is preferable to have a relatively high recording sensitivity, and for this reason, the thinner protective film 6 is preferable.

In this sense also, AlN is a suitable material. Because of its excellent moisture resistance, with the use of AlN in the protective film 6, the film thickness can be made thinner. Thus, the magneto-optical disk which ensures a high recording sensitivity can be achieved.

In the present embodiment, AlN is used both in the protective film 6 and the transparent dielectric film 2. Therefore, the magneto-optical disk of the present invention has an excellent moisture resistance. Moreover, since the same material is used in the transparent dielectric film 2 and the protective film 6, the productivity of the magneto-optical disk can be improved. As described, AlN has an excellent moisture resistance, and thus the AlN film can be set relatively thin (20 nm). The thinner film is preferable for the productivity as well.

In considering the above objective and effect, other than AlN, the following-materials, which can be used also as materials for the transparent dielectric film 2, are suitable for the protective film 6: SiN, AlSiN, AlTaN, SiAlON, TiN, TiON, BN, ZnS, $TiO_2$, $BaTiO_3$ and $SrTiO_3$.

Additionally, by using the same material in the protective film 6 and the transparent dielectric film 2, the productivity can be improved.

Especially, when SiN, AlSiN, AlTaN, TiN, BN or ZnS which does not include oxygen is used, a magneto-optical disk which has an excellent moisture resistance can be achieved.

Other than glass, chemically tempered glass may be used as a material for the substrate 1. Alternatively, a 2P layered glass substrate in which an ultraviolet ray hardening resin film is formed on the glass or chemically tempered glass substrate, polycarbonate (PC), polymethyl methacrylate (PMMA), amorphous polyolefin (APO), polystyrene (PS), polybiphenyl chloride (PVC), epoxy, etc., may be used for the substrate 1.

When chemically tempered glass is used as a material for the substrate 1, the following advantages can be obtained: excellent mechanical properties (in the case of a magneto-optical disk, vibration, eccentricity, warpage, tilt, etc.,) can be achieved; the hardness of the substrate 1 becomes large, and thus the disk is not likely to be scarred by dust or sand adhering thereto; by being chemically stable, it is not likely to be dissolved into various kind of solvent; sand or dust is not likely to adhere to the substrate 1 because it is difficult to be charged compared with the plastic substrate; by being chemically tempered, it is not easily broken; the moisture resistance, oxidization resistance and thermal resistance can be improved, and thus a reliable performance of the magneto-optical recording medium can be ensured for a long period of time; and having an excellent optical property, a high quality signal can be ensured.

Additionally, when the glass or chemically tempered glass is used as a material for the substrate 1, as a method for forming a guide track for guiding a light beam and for forming a signal called prepit formed beforehand on the substrate 1 for recording an address signal, etc., the reactive dry etching method to be carried out on the surface of the glass substrate 1 may be used. Alternatively, after an ultraviolet ray hardening resin called 2P layer is applied onto the glass substrate 1, a mold called stamper is pushed onto the resin layer. Then, after the resin is being hardened by projecting thereto an ultraviolet ray, the stamper is removed, thereby forming a guide track and a prepit on the resin layer.

When PC is used as a material for the substrate 1, the following advantages can be achieved: because an injection molding is permitted, a mass-production of the same substrate 1 is enabled, and thus the manufacturing cost can be reduced; having low humidity absorption compared with other plastics, a reliable performance of the magneto-optical disk can be ensured for a longer period of time; and excellent heat resistance and impact resistance can be achieved. Additionally, including PC, as to the materials, including PC, which permit injection molding, the guide track, the prepit, etc., can be formed simultaneously on the surface of the substrate 1 when molding only by installing the stamper onto the metal molding mold when injection molding.

In the above embodiment, the readout layer 3, the transfer layer 4 and the recording layer 5 are sandwiched between the transparent dielectric film 2 and the protective film 6 which are made of transparent dielectric substances. However, the present invention is not limited to this arrangement. For example, it may be arranged such that a reflective film (not shown) is provided between the protective film 6 and the overcoat film 7 which are made of the transparent dielectric substances. Alternatively, it may be arranged such that a radiating film (not shown) is provided between the protective film 6 and the overcoat film 7 which are made of the transparent dielectric substances.

In the present embodiment, the explanations have been given through the case of the magneto-optical disk as a magneto-optical recording medium. However, the present invention is not limited to this. For example, a magneto-optical tape, a magneto-optical card, etc., may be used as well. In the case of the magneto-optical tape, a tape base (base) is preferably used instead of the substrate 1.

While this invention has been disclosed in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A reproducing apparatus for reproducing data recorded onto a magneto-optical recording medium, wherein said medium comprises:

a base;

a readout layer formed on said base, said readout layer having perpendicular magnetization in a temperature range between room temperature and Curie temperature;

a transfer layer formed on said readout layer, said transfer layer is predominant in-plane magnetization at room temperature, and in which a transition occurs from in-plane magnetization to perpendicular magnetization at a temperature above room temperature;

a recording layer formed on said transfer layer, said recording layer having a Curie temperature lower than the Curie temperature of the transfer layer and which exhibits perpendicular magnetization in a temperature range between room temperature and Curie temperature; and wherein said apparatus comprises:

a magnetic field generation device to generate a subsidiary magnetic field which interacts only with said readout layer;

wherein the subsidiary magnetic field being generated has an intensity that is higher than an intensity of the coercive force of said readout layer and less than an intensity of the exchange coupling force exerted from said recording layer and said transfer layer to said readout layer;

a light projection means for projecting a reproducing light beam through first said base and then onto said readout layer so a portion of the magneto-optical recording medium, a central portion, is in a center of the beam spot of the reproducing light, so another portion of the magneto-optical recording medium, a surrounding portion, is within the beam spot and surrounds the central portion, so the in-plane to perpendicular magnetization transition occurs in the central portion of said transfer layer, so the central portion of the transfer layer is in a predetermined temperature range including the highest temperature in the transfer layer within the beam spot, and so the surrounding portion of the transfer layer is at a temperature below said temperature range, thus resulting that the exchange coupling force is exerted from said recording layer and said transfer layer to said readout layer in the central portion; and wherein said magnetic field generation device is operated while said light projection means projects said reproducing light beam onto said readout layer, so the magnetization direction is copied from said recording layer to said readout layer via said transfer layer by the exchange coupling force in the central portion, and the magnetization in said readout layer is arranged in the direction of the subsidiary magnetic field in the surrounding portion.

2. The apparatus of claim 1, in which the coercive force of the readout layer of the medium at room temperature is in a range of 10–50 kA/m.

3. The apparatus of claim 1, in which the Curie temperature of the readout layer of the medium is in a range of 200–300° C.

4. The apparatus of claim 1, in which the Curie temperature of the recording layer of the medium is in a range of 150–250° C.

5. The apparatus of claim 1, in which the Curie temperature of the readout layer of the medium is in a range of 200–300° C. and the Curie temperature of the recording layer is in a range of 150–250° C.

6. The apparatus of claim 1, in which the Curie temperature of the readout layer of the medium is higher than that of the recording layer.

7. The apparatus of claim 1, wherein said base of said medium comprises polycarbonate.

8. The apparatus of claim 1, wherein said base of said medium comprises chemically tempered glass.

9. The apparatus of claim 1, wherein said medium further comprises:

a dielectric film formed between said base and said readout layer;

a protective film formed on said recording layer; and an overcoat film formed on said protective film.

10. The reproducing apparatus of claim 1, wherein said light projection means projects a reproducing light onto said readout layer so as to create a Gaussian temperature distribution in the beam spot.

11. The apparatus of claim 9, wherein said dielectric film comprises AlN.

12. The apparatus of claim 9, wherein both said dielectric film and said protective film comprise AlN.

13. The apparatus of claim 9, wherein said dielectric film has a thickness in the range of 30–120 nm.

14. The apparatus of claim 9, wherein said dielectric film has a thickness in the range of 70–100 nm.

15. The apparatus as set forth in claim 9, wherein said transfer layer is made of $Gd_X(Fe_{1-Y}Co_Y)_{1-X}$, where composition rates X and Y respectively satisfy the following inequalities: $0.18 \leq X$; and $0.1 < Y < 0.5$.

16. The apparatus as set forth in claim 9,
wherein said transfer layer is made of $Gd_XFe_{1-X}$, where composition rate X satisfies the following inequality: 0.24<X<0.35.

17. The apparatus as set forth in claim 9,
wherein said transfer layer is made of $Gd_XCo_{1-X}$, where composition rates X satisfies the following inequality: 0.20<X<0.30.

18. The apparatus as set forth in claim 9,
wherein said transfer layer is made of $Tb_X(Fe_{1-Y}Co_Y)_{1-X}$, where composition rates X and Y respectively satisfy the following inequalities: 0.20<X<0.30; and 0<Y<1.

19. The apparatus as set forth in claim 9,
wherein said transfer layer is made of $D_{YX}(Fe_{1-Y}Co_Y)_{1-X}$, where composition rates X and Y respectively satisfy the following inequalities: 0.24<X<0.34; and 0<Y<1.

20. The apparatus as set forth in claim 9,
wherein said transfer layer is made of $Ho_X(Fe_{1-Y}Co_Y)_{1-X}$, where composition rates X and Y respectively satisfy the following inequalities: 0.25<X<0.45; and 0<Y<1.

21. The apparatus as set forth in claim 3,
wherein a film thickness of said transfer layer is in a range of 20 nm to 100 nm.

22. The apparatus of claim 1, wherein the coercive force of said readout layer at room temperature is smaller than the coercive force of said recording layer at room temperature.

23. A reproducing method from a magneto-optical recording medium which comprises a base, a readout layer formed on said base, which has perpendicular magnetization in a temperature range between room temperature and Curie temperature, a transfer layer formed on said readout layer, which is predominant in-plane magnetization at room temperature, and in which a transition occurs from in-plane magnetization to perpendicular magnetization at a predetermined temperature above room temperature and a recording layer formed on said transfer layer, having a Curie temperature lower than the Curie temperature of said transfer layer, which exhibits perpendicular magnetization in a temperature range between room temperature and Curie temperature, said reproducing method comprising the steps of:

projecting a light beam onto said readout layer from the side of said base of the magneto-optical recording medium so a portion of the recording medium, a central portion, is in a center of the beam spot of the light beam, so another portion of the recording medium, a surrounding portion, is within the beam spot and surrounds the central portion, so a transition occurs in the central portion of said transfer layer from in-plane magnetization to perpendicular magnetization, so the central portion of said transfer layer is in a predetermined temperature range including the highest temperature in the transfer layer within the beam spot, and so the surrounding portion of the transfer layer is at a temperature below said temperature range, thus resulting that the exchange coupling force is exerted from said recoding layer and said transfer layer to said readout layer in the central portion;

applying a subsidiary magnetic field having an intensity, the subsidiary magnetic field intensity being higher than an intensity of the coercive force of said readout layer and less than an intensity of the exchange coupling force exerted from said recording layer and said transfer layer to said readout layer while projecting said light beam onto said readout layer, thus resulting that the magnetization direction is copied from said recording layer to said readout layer via said transfer layer by the exchange coupling force in the central portion, and that the magnetization in said readout layer is arranged in the direction of the subsidiary magnetic field in the surrounding portion; and reproducing information based on a reflected light from only the central portion of said readout layer while applying the subsidiary magnetic field.

24. The reproducing method of claim 23, wherein said step of projecting a light beam includes projecting the light beam onto said readout layer so as to create a Gaussian temperature distribution in the beam spot.

25. The method of claim 23 wherein the coercive force of said readout layer at room temperature is smaller than the coercive force of said recording layer at room temperature.

* * * * *